United States Patent
Wang et al.

(10) Patent No.: US 9,729,919 B2
(45) Date of Patent: Aug. 8, 2017

(54) REMULTIPLEXING BITSTREAMS OF ENCODED VIDEO FOR VIDEO PLAYBACK

(71) Applicant: Microsoft Corporation, Redmond, WA (US)

(72) Inventors: Tzong-Jhy Wang, Seattle, WA (US); Yongjun Wu, Bellevue, WA (US); Shaun Ivory, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 594 days.

(21) Appl. No.: 13/917,558

(22) Filed: Jun. 13, 2013

(65) Prior Publication Data
US 2014/0369422 A1    Dec. 18, 2014

(51) Int. Cl.
*H04N 7/12*    (2006.01)
*H04N 21/4402*    (2011.01)
*H04N 21/434*    (2011.01)

(52) U.S. Cl.
CPC . *H04N 21/440218* (2013.01); *H04N 21/4341* (2013.01); *H04N 21/4344* (2013.01)

(58) Field of Classification Search
USPC ....................................................... 375/240
See application file for complete search history.

(56) References Cited

U.S. PATENT DOCUMENTS

| | | | |
|---|---|---|---|
| 6,907,081 B2* | 6/2005 | Mantchala et al. | 375/240.26 |
| 6,909,743 B1* | 6/2005 | Ward et al. | 375/240.01 |
| 7,046,805 B2 | 5/2006 | Fitzhardinge et al. | |
| 7,733,962 B2 | 6/2010 | Weiss et al. | |
| 8,290,346 B2 | 10/2012 | Ernst et al. | |
| 2003/0103765 A1* | 6/2003 | Sugahara | H04N 9/8045 386/241 |
| 2005/0281328 A1* | 12/2005 | Hurst et al. | 375/240 |
| 2007/0198931 A1 | 8/2007 | Ono et al. | |
| 2008/0253406 A1* | 10/2008 | Hasek | H04N 21/23439 370/535 |
| 2010/0166056 A1 | 7/2010 | Perlman et al. | |

(Continued)

FOREIGN PATENT DOCUMENTS

| | | |
|---|---|---|
| EP | 1737229 A1 | 12/2006 |
| WO | 01/50773 A1 | 7/2001 |

OTHER PUBLICATIONS

Adzic, et al., "Optimizing Video Encoding for Adaptive Streaming over HTTP", Retrieved at <<http://ieeexplore.ieee.org/stamp/stamp.jsp?tp=&arnumber=6227439>>, In the Proceeding of IEEE Transactions on Consumer Electronics, May 2012, pp. 7.

(Continued)

*Primary Examiner* — Dakshesh Parikh (57) ABSTRACT

An encoded bitstream is processed without re-encoding so as to recombine multiple packets of each image into contiguous data of one packet for the image. Each packet is assigned a presentation time stamp, corresponding to the display order of its image in the sequence of images. In one embodiment, each intra-frame compressed image also is marked as a recovery point indicating that a decompression processor empties its buffers of data for prior groups of pictures before processing the image. A video editing or other playback application uses the converted bitstream for scrubbing and similar playback operations.

20 Claims, 6 Drawing Sheets

(56) References Cited

U.S. PATENT DOCUMENTS

2011/0246883 A1 10/2011 Zizys et al.
2011/0317931 A1 12/2011 Dvir et al.
2012/0209815 A1 8/2012 Carson et al.

OTHER PUBLICATIONS

"When and How to Use H.264/AVC Remux MFT and MP4 Sink", Retrieved at <<http://msdn.microsoft.com/en-us/library/windows/desktop/jj553440(v=vs.85).aspx>>, Nov. 28, 2012, pp. 4.

Ozer, Jan., "Everything You Ever Wanted to Know About IDR Frames but Were Afraid to Ask", Retrieved at <<http://www.streaminglearningcenter.com/articles/everything-you-ever-wanted-to-know-about-idr-frames-but-were-afraid-to-ask.html>>, Dec. 27, 2011, pp. 5.

"AVCHD Format Specification Overview", Retrieved at <<http://www.avchd-info.org/format/index.html>>, Retrieved date: Apr. 8, 2013, pp. 2.

Sullivan, Gary J., "Advanced Video Coding (AVC) Standard and its Extensions", Retrieved at <<http://ewh.ieee.org/r5/denver/sps/PresentationArchive/2010_02_22_GarySull_IEEE_SPS_AVC_d1.pdf>>, Feb. 22, 2010, pp. 39.

"IMFSeekInfo interface", Retrieved at <<http://msdn.microsoft.com/en-us/library/windows/desktop/hh448054(v=vs.85).aspx>>, Nov. 22, 2012, pp. 3.

"International Search Report & Written Opinion for PCT Patent Application No. PCT/US2013/060892", Mailed Date: Mar. 5, 2014, Filed Date: Sep. 20, 2013, 11 Pages.

Shi, Qun, "Chapter 8—MPEG Standards: Section 3—The MPEG Systems Layer Standard", In Digital Consumer Electronics Handbook, A Publication of McGraw-Hill, May 1, 1997, 21 Pages.

\* cited by examiner

REMULTIPLEXING BITSTREAMS OF ENCODED VIDEO FOR VIDEO PLAYBACK

BACKGROUND

There are numerous file formats for storing video data in data files. Video data is commonly compressed according to a compression algorithm to produce a bitstream of compressed video data. Compressed bitstreams are stored in data files that have a specified file format. Thus video data generally has an encoded bitstream format and a file format.

One family of compression algorithms collects images from a sequence of images defining the video data into groups, called a group of pictures. The images in a group of pictures are processed using redundancies among the images in the group of pictures to reduce the amount of data required to represent each image. In general, such compression algorithms compress at least one image using only data within that image spatially, thus using "intraframe" compression. Such images, when compressed, are referred to as I-frames. Other images are compressed using data from other images, and thus such algorithms use "interframe" compression. If those other images occur in the sequence of images both before and after the image being encoded in display order, then the compression is "bidirectional", and the encoded image is called a "B"-frame. Other images may be compressed using data from other images that occur before the encoded image in display order in the sequence of images. These are commonly called "P"-frames.

Common compression technologies that uses I, P and B frames when compression long groups of pictures in video is MPEG-1, MPEG-2, MPEG-4 Part 2, H.264/AVC, SMPTE VC-1, and the coming HEVC. One in particular, called AVCHD, uses a compressed bitstream in the H.264/AVC coding format, and the encoded bitstream is in the MPEG-2 Transport Stream (M2TS) format. The M2TS format is optimized for streaming playback, such that compressed data for an image might be packetized in several packets, and these packets can be multiplexed in an encoded bitstream with other data, such as compressed audio. Such a file format is commonly used in consumer-grade video cameras that store AVCHD encoded video data into data files.

When video files are later played back or edited, the playback system of either a media player or a video editing system generally allows a user to scrub or seek through the video, for example to find a point of interest. Video data that is encoded without indexing information to some recovery pictures generally adds complexity to such a playback or editing system.

SUMMARY

This Summary introduces selected concepts in simplified form that are further described below in the Detailed Description. This Summary is intended neither to identify key or essential features of the claimed subject matter, nor to limit the scope of the claimed subject matter.

An encoded bitstream is processed without re-encoding so as to recombine multiple packets of each image into contiguous data of one packet for the image. Each packet is assigned a presentation time stamp, corresponding to the display order of its image in the sequence of images.

In one implementation, each intraframe compressed image also can be marked as a recovery point for fast seek or scrubbing. When a decompression processor begins processing an image that is so marked, data of prior groups of pictures in the sequence of images does not remain in the buffer used for decompression during playback, seek or scrubbing. With each intraframe compressed image so marked, a decompression processor thus empties its buffers before processing each intraframe compressed image when playing back, seeking or scrubbing video in the converted file format.

Accordingly, in one aspect, an original bitstream of video data is received into memory. For each image in a sequence of images, the bitstream includes a plurality of packets of data including compressed data for the image. The bitstream of video data is processed to gather the compressed video data for each image. A single packet is formed, comprising contiguous compressed video data for each image, wherein the single packet further has an associated presentation time stamp for the image. The packets for the images are stored as a converted bitstream in a data file format for use in playback, for example by a video editing application. In one implementation, each intraframe compressed image in the converted bitstream is marked as a recovery point indicating a decompression processor empties buffers of data from prior groups of pictures before processing the image. An example original bitstream is a bitstream that is compliant with an MPEG-2 transport stream file format with compressed data compliant with H.264/AVC standard. In a video editing or other playback application, scrubbing playback can use the converted bitstream, whereas the original bitstream can be used for streaming playback. A data file including the original bitstream can be associated with the data file including the converted bitstream.

In another aspect, a video editing or other playback application receives a data file including an original bitstream, and a data file including a converted bitstream, where the converted bitstream includes the video data from the original bitstream, converted into a bitstream with a single packet for each image, the single packet comprising contiguous compressed video data for the image and an associated presentation time stamp for the image. In one implementation, each intraframe compressed image in the converted bitstream is marked as a recovery point indicating a decompression processor empties buffers of data from prior groups of pictures before processing the image. In the video editing application, scrubbing playback can use the converted bitstream, whereas the original bitstream can be used for streaming playback.

These various aspects and implementations can be embodied in a computer-implemented process, computer, or an article of manufacture including computer storage media.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which such a video processing system can be implemented.

Figure 1:
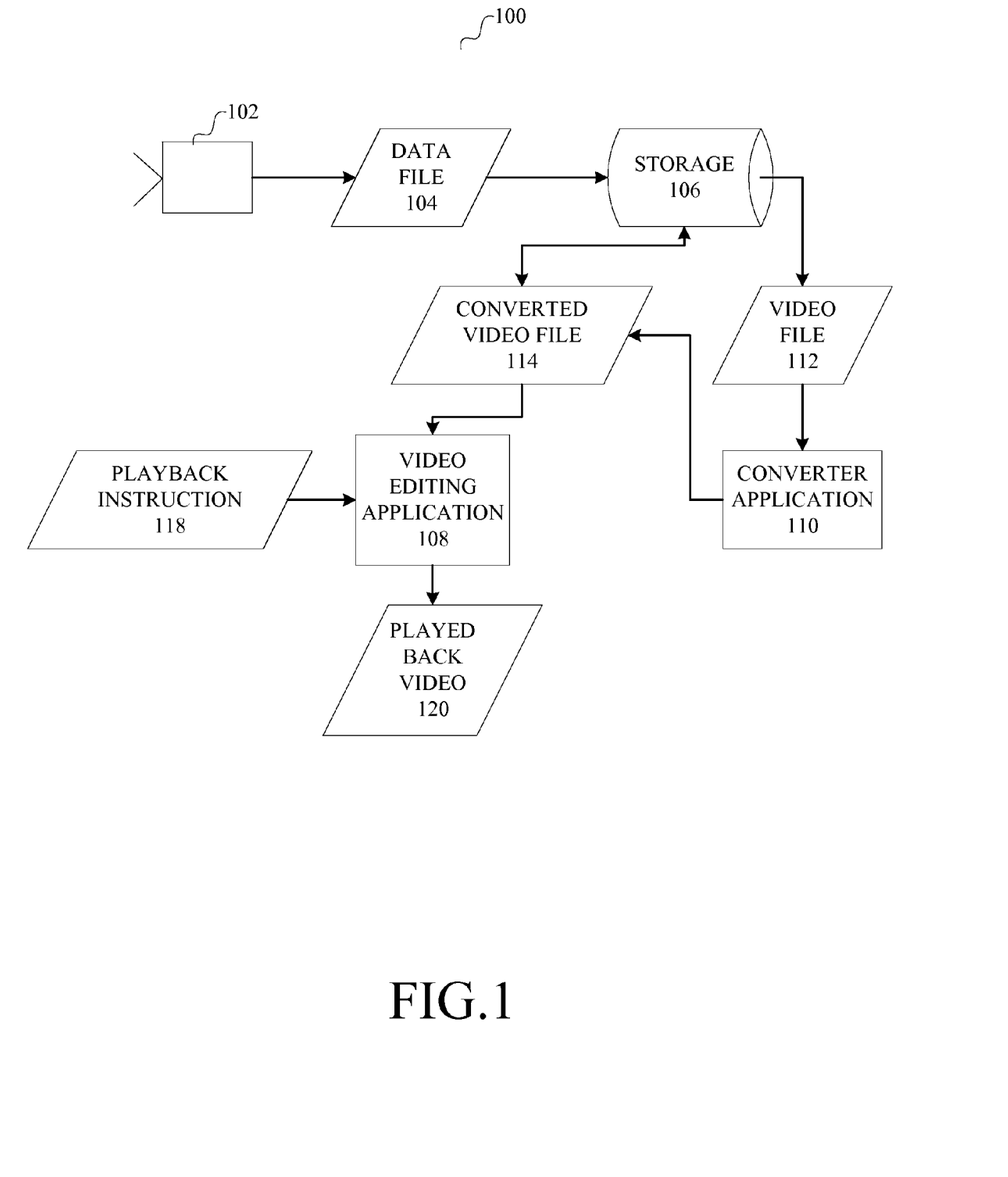
FIG. 1 is a block diagram of an example system for remultiplexing video data for playback.

Referring to FIG. 1, a video processing system 100 includes a camera 102 that generates motion video data in data files 104 on a computer-readable storage medium. The motion video data comprises a sequence of images taken at a periodic rate, called the frame rate. The sequence of images is encoded using intraframe and interframe compression, with the interframe compression using groups of pictures within the sequence of images, to produce an encoded bitstream. An example implementation of such compression is MPEG-1, MPEG-4 Part 2, SMPTE VC-1, H.264/AVC or MPEG-2 coding. The encoded bitstream can be multiplexed with other data and is stored in a data file, in a specified data file format. An example implementation of such a format is the AVCHD file format, which uses a compressed bitstream in the H.264 format, and the file format of an MPEG-2 transport stream (M2TS).

After motion video data is stored in a data file on a camera, it is commonly transferred to one or more other storage device(s) 106, such as an online storage system, storage on a computer, or the like. Such data files then can be accessed for a variety of uses, such as editing video using a video editing application 108 or similar application.

When compressed video data is stored in a file format in which data for an image is multiplexed with other data, such as compressed audio data, among multiple packets, such video data is difficult to use in a video editing application or other applications providing video playback, especially for playback during operations such a seeking and scrubbing. Thus, the video processing system 100 includes a converter application 110 that takes a video file 112 with motion video data and converts it into a converted video file 114 that is more efficient, faster, and optimized, for the video editing application 108 to work on. Thus, during certain playback operations such a seeking and scrubbing, depending on the playback instruction 118, the video editing application 108 uses the converted video file 114 to provide the played back video 120 to a display (not shown).

The converted video file 114 is generated by the converter application 110 by processing the encoded bitstream without re-encoding so as to recombine multiple packets of each image into contiguous data of one packet for the image. Each packet is assigned a presentation time stamp, corresponding to the display order of its image in the sequence of images.

In one embodiment, each intraframe compressed image also is marked as a recovery point for fast seek or scrubbing. When a decompression processor begins processing an image that is so marked, data of prior groups of pictures in the sequence of images does not remain in the buffer used for decompression during playback, seek or scrubbing. With each intraframe compressed image so marked, a decompression processor thus empties its buffers before processing each intraframe compressed image when playing back, seeking or scrubbing video in the converted file format.

The converter application 110 and video editing application 108 can be implemented as computer programs executed on a computer, such as a computer described below in connection with FIG. 6. The converter application and video editing application can be part of the same computer program or can be separate computer programs. They can be executed on the same computer or on different computers. Either application can be connected directly to storage device 106, or storage device 106 can be connected to the application by a computer network, such as local area network or other computer network, including the internet.

The converter application 110 can be invoked at the time a video data file is stored in storage device 106, or in response to user instruction, or in response to the video editing application accessing a video data file, or at other time prior to usage by the video editing application. The data file including the original bitstream in its original data file format is associated with the data file including the converted bitstream in its data file format. Thus, the video editing application is configured to access the converted file format in response to an editing command that involves seeking, scrubbing or other similar playback operation.

Given this context, an example implementation of a converter will be described in more detail in connection with FIGS. 2-5.

Figure 2:
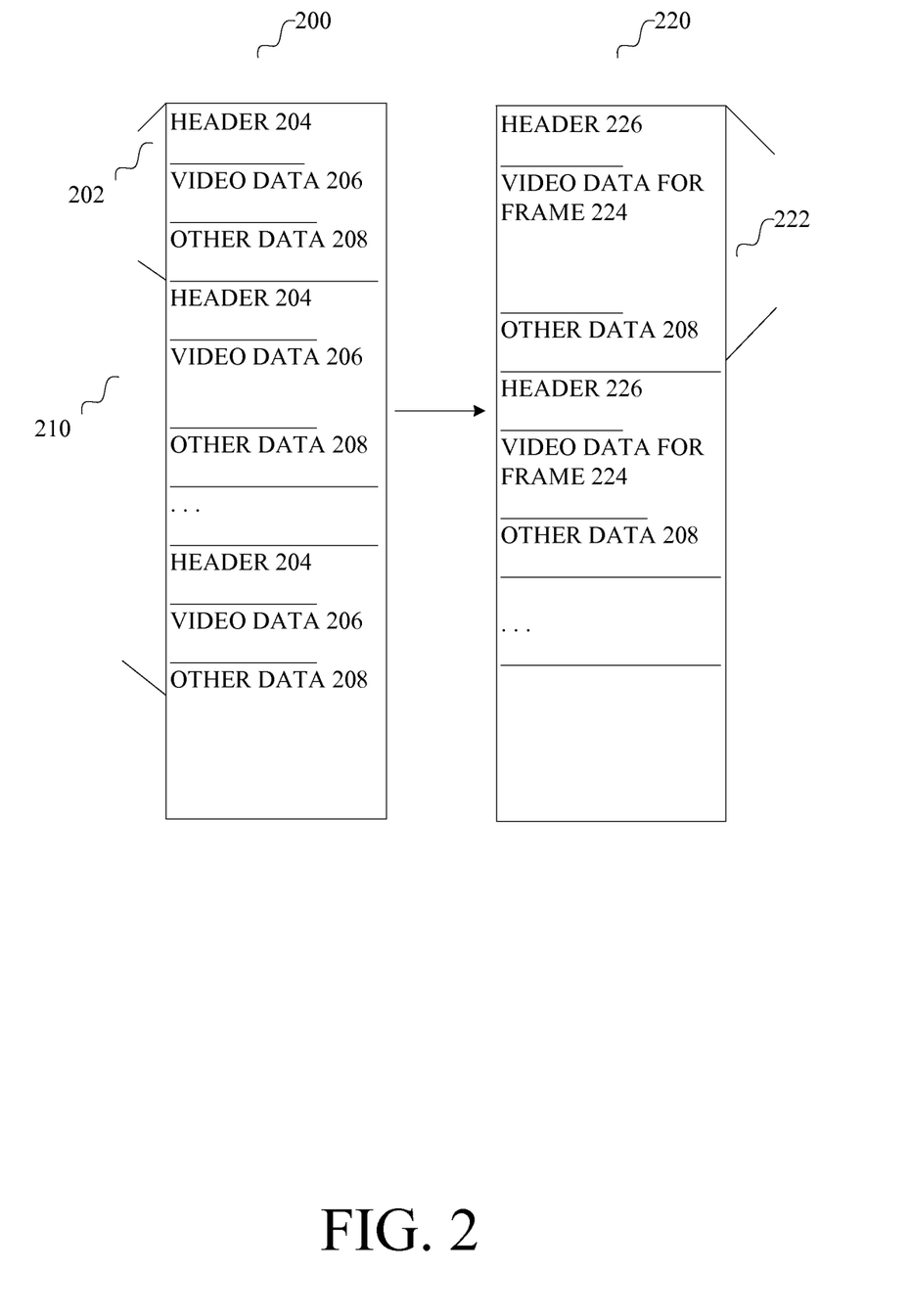
FIG. 2 is a diagram illustrating example bitstream formats processed and produced by such a system.

In FIG. 2 example data file formats are shown. These file format illustrations are simplistic drawings of example characteristics of file formats and are not intended to illustrate the complexity of an actual file format.

In this example an original file format 200 has video data for each image in an encoded bitstream multiplexed with other data, such as compressed audio data. In particular, the bitstream includes packets 202 of data, with each packet having a header 204, video data 206 and other data 208. Multiple packets, as shown at 210, are used to represent one image in a sequence of images of motion video data.

Also shown is the converted file format 220, in which each packet 222 contains video data 224 for an entire image or frame. The header 226 for the video data 224 includes at least a presentation time stamp representing at least the relative display order of this image with respect to other images in the sequence of images of motion video data. Additionally, the header 226 for each intraframe compressed image also can include data marking the image as a recovery point, indicating to a decompression processor to empty its buffers of data of prior groups of pictures in the sequence of images before processing the intraframe compressed image before processing the image for playback, seeking or scrubbing.

Figure 3:
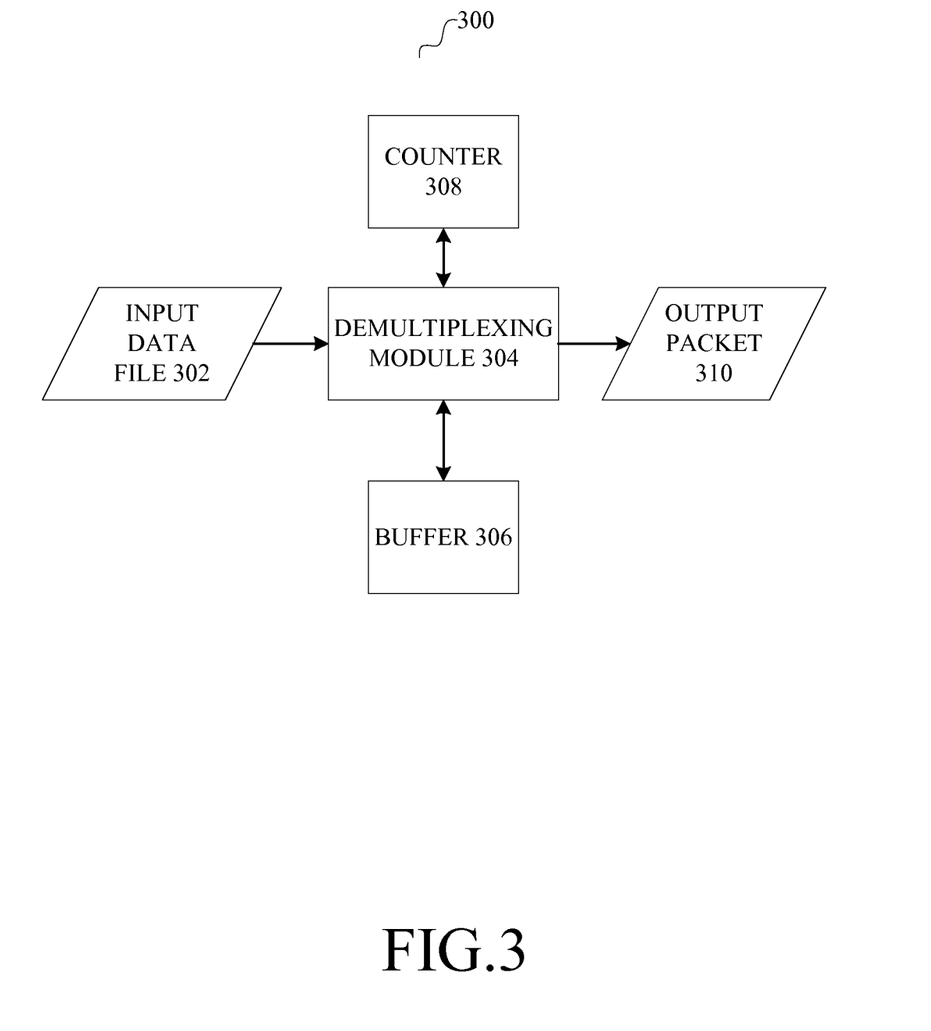
FIG. 3 is a data flow diagram an example implementation of a remultiplexing system.

Referring now to FIG. 3 a data flow diagram of an example implementation of a converter 300 will now be described.

In this implementation, an input data file 302 is received by a demultiplexing module 304 that reads each packet of the input data file 302 to extract video data from the packet and combine that video data from other video data for the same image from other packets, thus using a buffer 306. Each image is assigned a presentation time stamp corresponding to its display order in the sequence of images. A counter 308 can be used to maintain an accurate count of the presentation time stamp to be associated with each image if such data is not provided with each image in its header data. Using the data in the buffer 306 and optionally the counter 308, the demultiplexing module 304 outputs an output packet 310 for each image in the sequence of images, where an output packet includes contiguous data for a complete image and has a presentation time stamp for that image corresponding to its display order.

Figure 4:
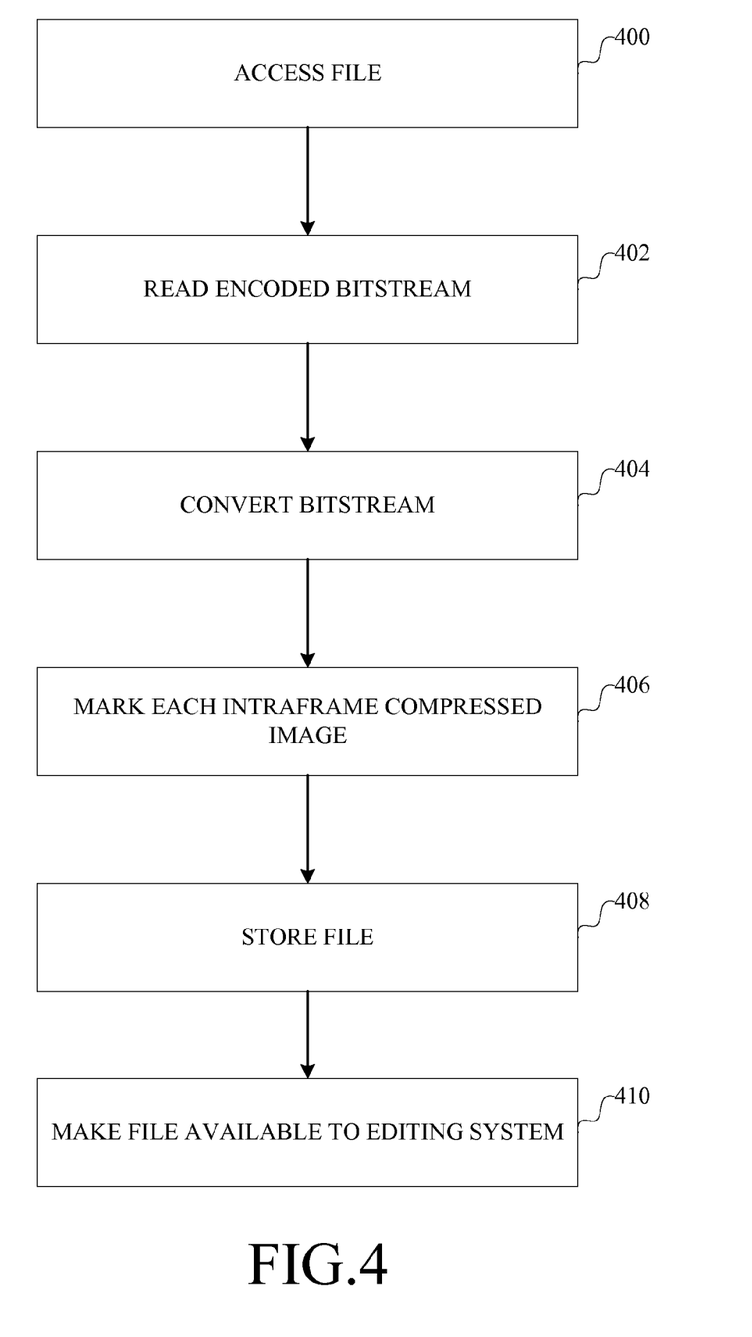
FIG. 4 is a flow chart describing an example implementation of remultiplexing.

Referring now to FIG. 4, a flowchart of an example implementation of a process for remultiplexing video data will now be described.

The input data file is accessed 400. From the input data file, the encoded bitstream of video data is read 402 from the input data file. The encoded bitstream is converted 404 without re-encoding, as described above, into the desired output bitstream format. Each intraframe compressed image is then marked 406 indicating to a decompression processor to empty its buffers of data of prior groups of pictures in the sequence of images before processing the intraframe compressed. The converted bitstream is then stored 408 in the output file format. This stored data file can then be made available 410 for use in a video editing application for use in playback of slow or fast forward or backward motion, seeking, scrubbing and/or single frame stepping through the video.

Figure 5:
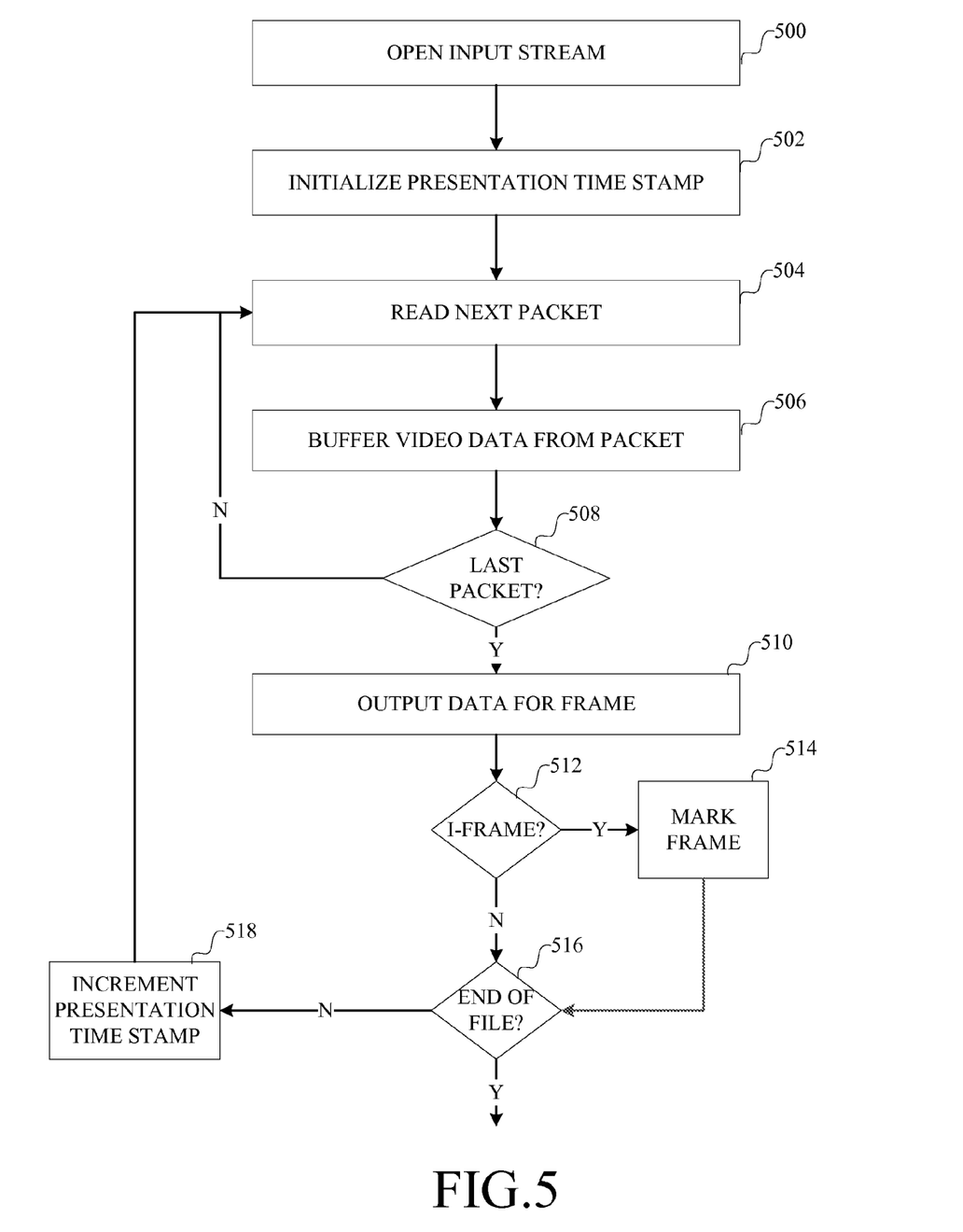
FIG. 5 is a flow chart describing a more detailed example implementation of remultiplexing.

A more detailed implementation of such a process will now be described in connection with FIG. 5.

The input stream is opened 500 for reading. A presentation time stamp is initialized 502, setting an initial presentation time stamp for a first frame or image to be read from the input stream. The initial presentation time stamp can be a default value or can be provided by metadata in the input stream.

The next packet is then read 504 from the input stream. The video data from the packet is added 506 to a buffer of the current frame of video data. If this packet is the last packet for a frame, as determined at 508, then the data for the frame is output 510 in the new format with the current presentation time stamp. If the packet is not the last packet for the frame, then the process continues with reading 504 the next packet from the input stream.

After outputting a frame, at 510, if the frame is an I-frame, as determined at 512, then it is marked 514 as a recovery point. If the end of the input stream has been reached, as determined at 516, then processing ends. Otherwise, the presentation time stamp is incremented 518 for the next frame, for which the next packet of data is read at 504.

Using such a system, during certain playback operations such a seeking, and scrubbing, depending on the playback instruction, a video editing application uses the converted data file to provide the played back video to a display.

Having now described an example implementation, a computer with which components of such a system are designed to operate will now be described. The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 6:
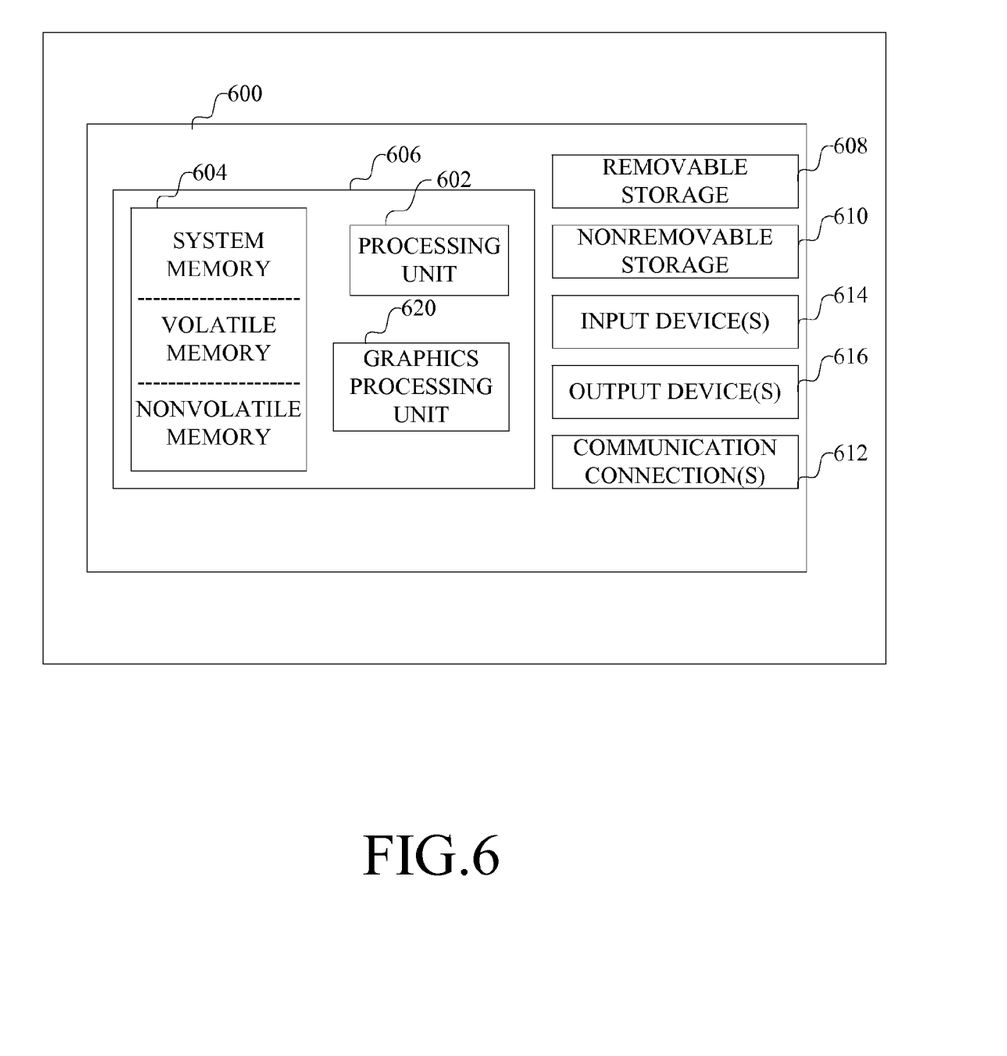
FIG. 6 is a block diagram of an example computer with which components of such a system can be implemented.

FIG. 6 illustrates an example of a suitable computer. This is only one example of a suitable computer and is not intended to suggest any limitation as to the scope of use or functionality of such a computer.

With reference to FIG. 6, an example computer 600, in a basic configuration, includes at least one processing unit 602 and memory 604. The computer may include multiple processing units and/or additional co-processing units such as graphics processing unit 620. Depending on the exact configuration and type of computer, memory 604 may be volatile (such as RAM), non-volatile (such as ROM, flash memory, etc.) or some combination of the two. This configuration is illustrated in FIG. 6 by dashed line 606.

Additionally, computer 600 may also have additional features/functionality. For example, computer 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 600. Any such computer storage media may be part of computer 600. A storage medium is any functional device into which data can be entered at one or more physically-addressable components, retained at the one or more physically-addressable components and retrieved from the one or more physically-addressable components.

Computer 600 may also contain communications connection(s) 612 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 612 are devices that interface with the communication media to transmit data over and receive data from communication media, such as a network interface.

Computer 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process performed by a processor in a computer, comprising:
    receiving, into memory, an original bitstream of high definition video data wherein, for each image in a sequence of images, the bitstream includes a plurality of packets of data including compressed data for the image;
    processing the bitstream of video data to gather, for each image, the compressed video data for the image into contiguous compressed video data for the image;
    forming a single packet for each image, the single packet comprising the contiguous compressed video data for the image, wherein the single packet further has an associated presentation time stamp for the image corresponding to the display order of its image in the sequence of images; and
    storing the single packets for the images as a converted bitstream in a data file format for use in playback.

2. The computer-implemented process of claim 1, further comprising marking each intraframe compressed image in the converted bitstream as a recovery point indicating a decompression processor empties buffers of data from prior groups of pictures before processing the image.

3. The computer-implemented process of claim 1, wherein the original bitstream is compliant with an MPEG-2 transport stream file format.

4. The computer-implemented process of claim 1, wherein the compressed data is compliant with H.264/AVC standard.

5. The computer-implemented process of claim 1, wherein scrubbing playback by a video editing application uses the converted bitstream.

6. The computer-implemented process of claim 1, wherein a video editing application uses the original bitstream for streaming playback and the converted bitstream for scrubbing playback.

7. The computer-implemented process of claim 1, further comprising associating a data file including the original bitstream with a data file including the converted bitstream.

8. An article of manufacture comprising:
    a computer storage medium;
    computer program instructions stored on the computer storage medium which, when processed by a processing device, instruct the processing device to perform a process comprising:
    receiving, into memory, an original bitstream of high definition video data wherein, for each image in a sequence of images, the bitstream includes a plurality of packets of data including compressed video data for the image;
    processing the bitstream of video data to gather, for each image, the compressed video data for the image into contiguous compressed video data for the image;
    forming a single packet for each image, the single packet for an image comprising the contiguous compressed video data for the image, wherein the single packet further has an associated presentation time stamp for the image corresponding to the display order of its image in the sequence of images; and
    storing the single packets for the images as a converted bitstream in a data file format for use in playback.

9. The article of manufacture of claim 8, further comprising marking each intraframe compressed image in the converted bitstream as a recovery point indication a decompression processor empties buffers of data from prior groups of pictures before processing the image.

10. The article of manufacture of claim 8, wherein the original bitstream is compliant with an MPEG-2 transport stream.

11. The article of manufacture of claim 8, wherein the compressed video data is compliant with an H.264/AVC standard.

12. The article of manufacture of claim 8, wherein scrubbing, seeking and playback by a video editing application uses the converted bitstream.

13. The article of manufacture of claim 8, wherein a video editing application uses the original bitstream for streaming playback and the converted bitstream for scrubbing playback.

14. The article of manufacture of claim 8, wherein the process further comprises associating a data file including the original bitstream with a data file including the converted bitstream.

15. A computer comprising:
    a memory,
    a processor connected to the memory and programmed to:
    receive, into the memory, an original bitstream of high definition video data wherein, for each image in a sequence of images, the bitstream includes a plurality of packets of data including compressed video data for the image;

process the bitstream of video data to gather the compressed video data for each image;

form, for each image, a single packet comprising the contiguous compressed video data for the image, wherein the single packet further has an associated presentation time stamp for the image corresponding to the display order of its image in the sequence of images; and store the single packets for the images as a converted bitstream in a data file format in storage for use in playback.

16. The computer of claim 15, where in the processor marks each intraframe compressed image in the converted bitstream as a recovery point indicating a decompression processor empties buffers of data from prior groups of pictures before processing the image.

17. The computer of claim 15, wherein the original bitstream is compliant with an MPEG-2 transport stream.

18. The computer of claim 15, wherein the compressed bitstream is compliant with an H.264/AVC standard.

19. The computer of claim 15, wherein a video editing application uses the original bitstream for streaming playback and the converted bitstream for scrubbing playback.

20. The computer of claim 15, wherein a data file including the original bitstream is associated with a data file including the converted bitstream.

* * * * *